(12) United States Patent
Hendrey

(10) Patent No.: US 8,489,324 B2
(45) Date of Patent: Jul. 16, 2013

(54) RETRIEVAL OF VEHICULAR TRAFFIC INFORMATION OPTIMIZED FOR WIRELESS MOBILE ENVIRONMENTS

(75) Inventor: Geoffrey R. Hendrey, San Francisco, CA (US)

(73) Assignee: deCarta Inc., San Jose, CA (US)

( * ) Notice: Subject to any disclaimer, the term of this patent is extended or adjusted under 35 U.S.C. 154(b) by 468 days.

(21) Appl. No.: 12/416,812

(22) Filed: Apr. 1, 2009

(65) Prior Publication Data

US 2009/0254272 A1 Oct. 8, 2009

Related U.S. Application Data

(60) Provisional application No. 61/041,595, filed on Apr. 1, 2008.

(51) Int. Cl.
*G01C 21/00* (2006.01)

(52) U.S. Cl.
USPC .......................................... 701/423; 701/415

(58) Field of Classification Search
USPC .......................................... 701/210, 423, 415
See application file for complete search history.

(56) References Cited

U.S. PATENT DOCUMENTS

| | | | |
|---|---|---|---|
| 5,963,956 A | 10/1999 | Smartt | |
| 6,349,262 B1 * | 2/2002 | Lewiner et al. | 701/465 |
| 6,490,519 B1 * | 12/2002 | Lapidot et al. | 701/117 |
| 7,813,741 B2 * | 10/2010 | Hendrey et al. | 455/456.1 |
| 2005/0137781 A1 * | 6/2005 | Hudson | 701/117 |
| 2006/0025925 A1 * | 2/2006 | Fushiki et al. | 701/210 |
| 2007/0138347 A1 * | 6/2007 | Ehlers | 246/1 R |
| 2008/0234921 A1 * | 9/2008 | Groenhuijzen et al. | 701/118 |

OTHER PUBLICATIONS

PCT International Search Report and Written Opinion, PCT/US2009/039189, May 18, 2009, 6 Pages.
Dijkstra, E.W., "A Note on Two Problems in Connexion with Graphs," Numerische Mathematik, 1959, pp. 269-271, vol. 1.
XM Navtraffic® Overview, XM Satellite Radio, 2001-2008, 2 pages.

* cited by examiner

*Primary Examiner* — Michael Fuelling
(74) *Attorney, Agent, or Firm* — Fenwick & West LLP

(57) ABSTRACT

Two-way communication between a mobile device and a server is used to provide increased relevance of traffic information at lower bandwidth. The complexity, amount of storage and processing power required of the mobile navigation device are minimized, since the server performs much of the required computing. A transactional billing model can be used to bill the driver based on usage or consumption of traffic information. A driver selects a destination and routing preferences on a mobile device, and the local system generates a routing. The mobile device sends the planned route and preferences to a server. The server uses real-time traffic flow and incident information to determine an estimated driving time for the planned route. The server may also generate alternative routes, with an estimated time for each alternative route. The traffic and time information for the planned and alternative routes are then transmitted back to the mobile device.

14 Claims, 3 Drawing Sheets

RETRIEVAL OF VEHICULAR TRAFFIC INFORMATION OPTIMIZED FOR WIRELESS MOBILE ENVIRONMENTS

CROSS-REFERENCE TO RELATED APPLICATIONS

This application claims the benefit of U.S. Provisional Application 61/041,595, filed on Apr. 1, 2008 and incorporated by reference herein in its entirety.

BACKGROUND

1. Field of the Invention

The present invention is directed to the use of navigation systems. In particular, the present invention enables real-time, historical and predicted traffic information about specific routes to be used in route planning.

2. Description of the Related Art

Navigation systems are popularly used to guide travelers to destinations. Such systems are available built into vehicles or free-standing, to be moved from vehicle to vehicle; for use by drivers and/or pedestrians; as purpose-built devices or as applications on general-purpose devices such as personal digital assistants or mobile telephones; and as systems that are entirely self-contained or as systems that utilize a remote server to perform some or all of their calculations. We refer generally to these systems as "navigation systems."

Since navigation systems are most commonly used by drivers of vehicles, we frequently refer to the user of such a system as "the driver". However, the description of the invention that follows is not intended to be limited only to vehicle drivers; it may be applied equally to any use in which the user of the system is any kind of traveler, including, for example, a pedestrian, a bicycle rider, or a person using multiple modes of transportation, such as walking and riding public transit vehicles.

A common problem faced by the driver is vehicular congestion on roadways, i.e. traffic. Information about traffic conditions is typically made available to interested people through a variety of mechanisms, including television and radio reporting, subscription services, etc. Traffic information may encompass both flow and incident information. Traffic flow is a measure of the rate at which traffic is moving along a roadway, for example the number of cars passing a certain point every minute, or as an average speed of traffic along the roadway. Traffic incident information includes information about collisions, construction work, or other events that typically have a negative impact on traffic flow.

The more information that is made available to a driver about traffic incidents and flow, the more informed a choice the driver can make about route planning, thereby leading to less delay and higher utility.

SUMMARY

The present invention uses two-way communication between a mobile device and a server to increase the relevance of retrieved traffic information to each driver, while minimizing bandwidth required to do so. The complexity, amount of storage and processing power required of the mobile navigation device are minimized, since the server performs much of the required computing. In addition, a transactional billing model can be used to bill the driver based on usage or consumption of traffic information by the navigation system.

In one embodiment, a driver selects a destination on a mobile device such as a GPS or other navigation system, and the local system generates an initial routing. The driver in some embodiments also provides routing preferences via the local device. The mobile device then sends the planned route and any routing preferences over a network to a server. The server has access to real-time traffic flow and incident information, and determines an estimated driving time for the planned route based on current conditions. In some embodiments, the server also generates alternative routes, with an estimated time for each alternative route. The traffic and estimated time information for the planned and alternative routes are then transmitted back to the mobile device. In some embodiments, the driver is billed for the transaction.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
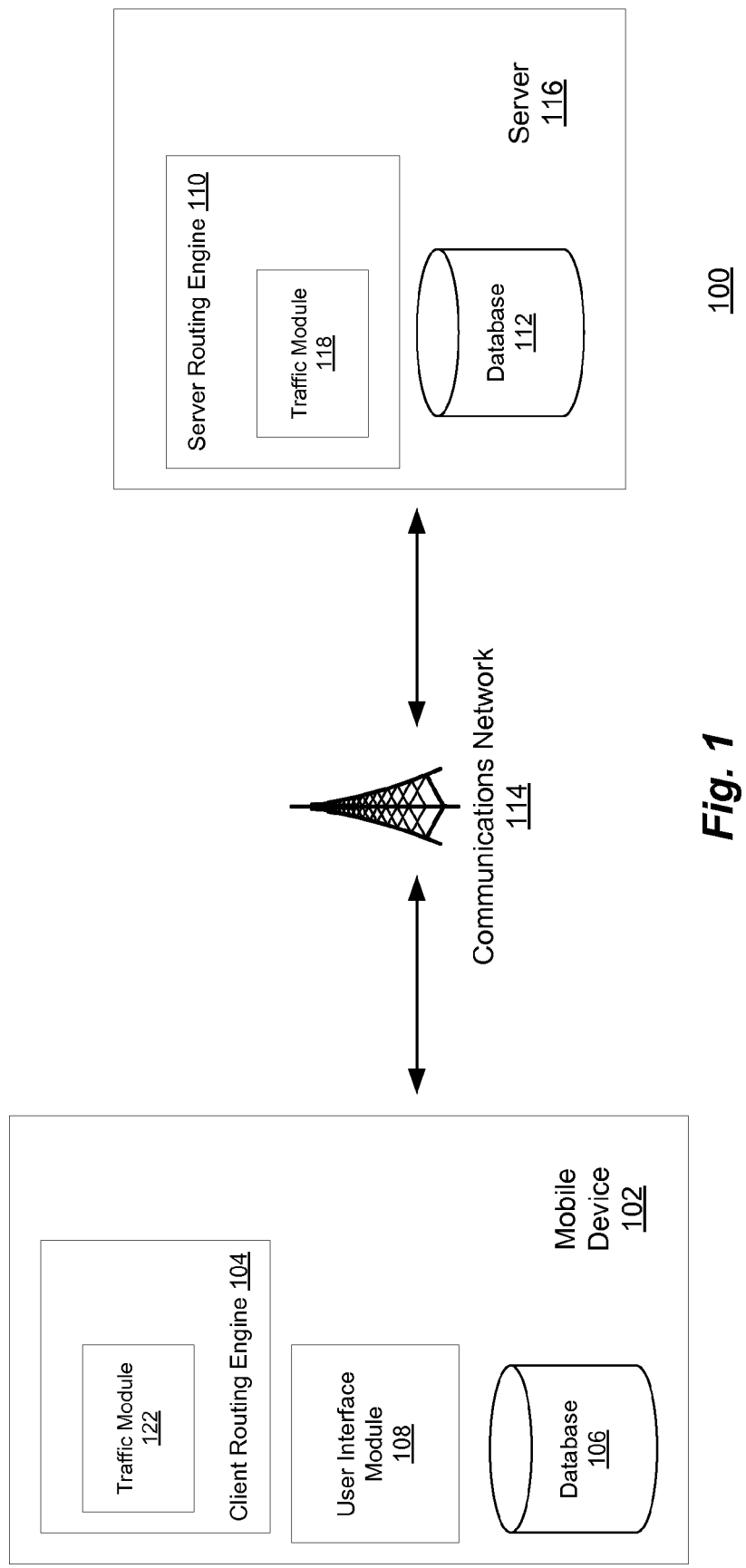
FIG. 1 is a diagram of a mobile device in communication with a server in accordance with an embodiment of the present invention.

FIG. 1 illustrates a system 100 for providing traffic information optimized for mobile environments in accordance with an embodiment of the present invention. A mobile device 102 is in communication with a server 116, and includes a client routing engine 104, database 106 and user interface (UI) module 108. Server 116 includes a server routing engine 110 and database 112. Client routing engine 104 and server routing engine 110 each include a traffic module 122, 118, respectively. Mobile device 102 and server 116 are in communication with one another via a communications network 114, which may be any combination of cellular, Wi-MAX, WAN or any other suitable network. Mobile device 102 and server 116 each include additional hardware and software for performing additional routing and guidance functions that are either known to those skilled in the art or not germane to this description, and which are therefore not described here. Furthermore, we refer generally to system 100 to describe the collection of components performing various steps throughout this description. In practice, various elements of system 100 are systems in and of themselves; for example, mobile device 102 in one embodiment is a self-contained system sold separately from server 116, which itself may be made available in whole or in part and separately from the other identified components.

System 100 is able to assist a driver in two different ways—namely, by helping with route planning, and by providing real-time information to the driver while she is en route.

Route planning occurs before the driver embarks from an origin to a destination, and includes selecting a destination address, optionally accompanied by waypoints, and providing route preferences such as "fastest", "easiest", "avoid tolls", etc.

En-route real-time information is provided in the form of alerts, accompanied when appropriate by detour options that attempt to minimize the delaying effects of traffic. Real-time information is useful to the driver even when not traveling along a route planned using the navigation system.

Typically, radio broadcast signals are used for distributing approximately real-time traffic information. When radio broadcast is used, all mobile units in the broadcast area receive the same traffic information. Each of the mobile units in the broadcast area must store and update all received traffic information in a local database in order to retain that information for use during route planning and detour handling. Because of the latency inherent in transmitting large volumes of traffic information through a relatively low-bandwidth broadcast channel, broadcast traffic information can only approximate real-time traffic information. That is, the fact that a large volume of information is being transmitted through a relatively low-bandwidth channel means that the delay before receipt of information regarding a particular road segment is unpredictable and may be substantial. The greater the latency, the less relevant the traffic information to the driver. In addition, mobile units must have sufficient processing and storage power to store and query traffic information received via the broadcast.

Alternate Route Choices During Route Planning Phase

Figure 2:
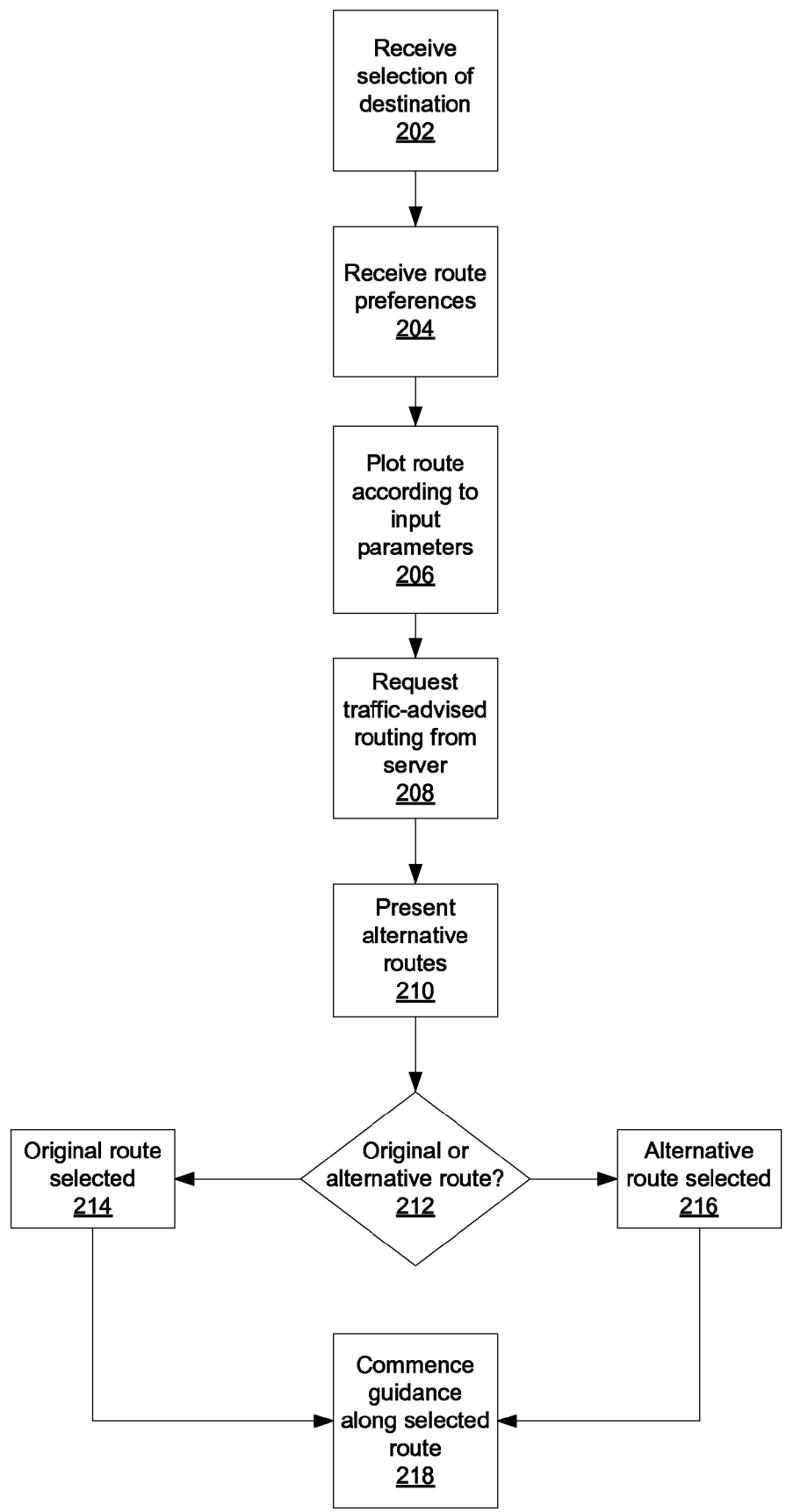
FIG. 2 is a flowchart illustrating a method for obtaining real-time traffic routing information on a mobile device in accordance with an embodiment of the present invention.

Referring to FIG. 2, in one embodiment traffic-advised route planning using system 100 proceeds as follows. The driver selects 202 a destination using any of a variety of methods through user interface module 108; for example by address entry, web-based point-of-interest (POI) searching, or recently visited points. Upon selecting a destination, the driver optionally provides 204 routing preferences such as "fastest", "easiest", etc. Routing engine 104 subsequently determines 206 a route from origin to destination. To eliminate the need for local storage and processing of traffic information, in one embodiment the initial route does not consider traffic conditions.

Mobile device 102 then presents the driver with an option to retrieve traffic-advised alternative routes. In some embodiments the option to retrieve traffic advised routes is a system setting. In other embodiments, the option is presented as a button requiring user selection. In either embodiment, a request is transmitted 208 by traffic module 122 to the server 116, requesting traffic-advised alternate routes. In one embodiment, traffic module 122 transmits routing preferences along with the route.

In some cases, such as where mobile device 102 has a strong connection with network 114, a response from the server 116 is received immediately. In other cases, if the driver is out of range, or the server 116 is unusually busy, for example, or not available for some other reason, a response may be delayed. Accordingly, in one embodiment traffic module 122 waits a threshold amount of time to receive traffic information, and if it does not receive the information prior to the threshold time elapsing, client routing engine 104 begins the route guidance immediately using the locally planned route. Alternatively, if traffic module 122 receives the traffic information response from server 116 prior to the expiry of the threshold time, traffic module 122 adjusts the route as described below, and route guidance begins with the adjusted route. In alternative embodiments, mobile device 102 can be configured always to wait for traffic information, or never to wait for traffic information before beginning route guidance. In some embodiments the driver can configure the threshold time period, while in other embodiments the manufacturer sets the threshold, which may or may not be changeable by the driver, depending on the implementation.

Server routing engine 110 receives the route locally generated by client routing engine 104, and uses it as a basis for generating alternative routes. The route may be specified in any of multiple ways, for example by specifying the route geometry and using a compression algorithm.

Figure 3:
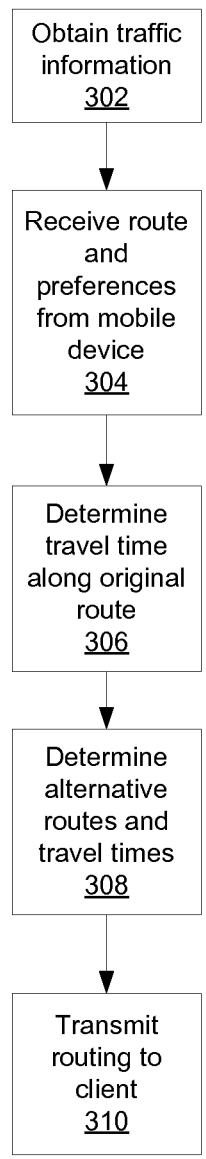
FIG. 3 is a flowchart illustrating a method for providing real-time traffic routing information to a mobile device in accordance with an embodiment of the present invention.

Referring now to FIG. 3, server-based traffic module 118 obtains 302 traffic information from primary sources, including human operator input, police and highway patrol real-time databases, public transportation databases, and the like. Once server 116 has received 304 the route, along with optional alternate route preferences, from the mobile device 102, server routing engine 110 determines 306 a revised travel time along the original route, taking into account known traffic conditions, as monitored by traffic module 118. Next, routing engine 110 determines 308 one or more alternate routes, taking into account routing preferences received from mobile device 102, and traffic conditions available from traffic module 118.

In addition to real-time traffic information, in various embodiments server traffic module 118 considers historic traffic (that is, traffic as observed at similar times of day on similar days in the past), and predictive traffic (that is, traffic as predicted on the basis of relevant external information, such as weather forecasts and schedules of events such as concerts or sporting events that are likely to draw large crowds and thereby affect traffic) when estimating driving times on the locally-planned and server-generated alternate routes. In one embodiment, traffic module 118 gives real-time traffic information the highest priority for consideration, falling back on historic information where no real-time information is available. In another embodiment, predictive traffic information is given higher priority than historic information. Those of skill in the art will understand that many methods of combining real-time, historical, and predictive traffic information are possible.

Server 116 then transmits 310 the routing information to client module 102. In one embodiment, alternate routes are returned in a compressed image format, such as PNG, displaying all the alternative routes on the same map image or in multiple map images. In one embodiment, the image or images also include flow highlights representing traffic flows both on and off the alternate routes, covering the extent of the map image. This minimizes bandwidth and provides increased relevance. Routing information can also be expressed geometrically, as noted above.

Returning to FIG. 2, upon receipt of the items listed above, user interface 108 presents 210 the alternatives to the user, allowing the user to either choose 212 an alternative 214 or remain with the original, locally-computed route 216. In one embodiment, the route guidance phase commences 218 only after the user has made a selection. However, in order to facilitate the asynchronous delivery of alternative routes, the user may be allowed to commence guidance and travel along the original route before the alternate route choices are returned by the server, as described above.

A potential difficulty arises with the asynchronous delivery of alternate routes. That is, it may be that the driver has commenced route guidance using the locally-generated route, and has traveled sufficiently far from his origin such that by the time the alternate routes are received from server 116, they are no longer relevant to his current position. For example, if the driver leaves his driveway, and heads east instead of west, any alternative routes beginning with "head west for 1 mile" are no longer valid. In order to facilitate the asynchronous delivery of traffic advised alternate routes, hints and heuristics may be used by both the client 102 and the server 116 to minimize the chance that an alternate route will be invalid. For example, in one embodiment, mobile device 102 sends the vehicle's position and velocity to server 116, so that the server may project a route origin, in conjunction with knowledge of the road database. In addition, historic information about the driver's or vehicle's travel patterns may be used. For example, database 112 in one embodiment contains previous routes associated with mobile device 102 and may indicate, for example, that the user turns west from his driveway in most instances.

In various embodiments, traffic-advised alternate routes can also be provided to clients of the "off-board" variety, that is, clients that do not have a local copy of the road database 106. To enable this mode of operation, traffic-advised alternate routes work cooperatively with a technology that extracts and transmits to the client device corridors of map data containing information regarding roads along a computed route as well as, optionally, other roads or points of interest near the computed route. Instead of a route being sent from the client 102 to the server 116, only the origin and destination need be sent to the server. In one embodiment, the traffic-advised alternate route information is returned accompanying the extracted route corridor.

In one embodiment, user interface 108 includes a "time slider", that is, an input that allows a user to control the display of historical and predictive traffic over a range of time periods for any specified route. Mobile device 102 sends the route with a request for the data to server 116, which then responds with the requested information.

Retrieval of Traffic Information Along a Path

Regardless of whether guidance has commenced along the original route or a selected alternative route or the user is simply driving without guidance, it is desirable to provide the user with timely and relevant traffic information.

In one embodiment, system 100 prioritizes traffic information as high, medium or low. High relevance traffic information includes traffic along the driver's expected or planned path of travel. Medium relevance traffic is that near the driver's route or path of travel, including with regard to roads that intersect the planned route. Low relevance traffic is other traffic information within the surrounding area.

When the server 116 returns traffic data to mobile device 102, the amount of data requested and returned can be modulated in several ways. In one embodiment, the data returned includes a MAX_DISTANCE parameter, a MAX_TIME parameter, MIN_SEVERITY and MIN_FLOW thresholds, and a current location along the path.

The MAX_DISTANCE parameter specifies the farthest distance from the route for which traffic information should be returned. The MAX_TIME parameter specifies the maximum distance along the route or path of travel, measured in estimated driving time, for which traffic information will be returned. The MAX_DISTANCE and MAX_TIME parameters are used to prevent the retrieval of copious volumes of potentially irrelevant traffic information. For example, on a route from San Francisco to Los Angeles, it makes little sense to retrieve real-time traffic for the portion of the route more than 100 miles from San Francisco at the time the user leaves San Francisco, since the real-time traffic will be significantly different by the time the driver reaches the point 100 miles down the route. The MAX_DISTANCE parameter expresses the limitation in terms of a maximum distance of travel (or Euclidean distance) whereas the MAX_TIME parameter expresses the limitation as a maximum driving time. The MIN_SEVERITY threshold specifies the minimum severity a traffic incident must have in order to be included in the traffic information. The MIN_FLOW is a minimum flow restriction value. Only traffic information representing a flow restriction more restrictive than the threshold will be returned. Finally, when a route is known, the traffic should only be retrieved ahead of the vehicle's current position on the route. This can be accomplished by providing the vehicle's current position. Those of skill in the art will appreciate that more or fewer or no restrictions may be placed on the requested traffic information.

Because the server has a road database 112, when the driver is not traveling under guidance, that is, the driver is not on a pre-computed route, the driver's current location can be map-matched using methods known in the art, and information can then be retrieved ahead along the current road of travel, modulated as described above.

Bandwidth permitting, the server can return the forms of information categorized above as medium and lower priority. In one embodiment, the server 116 combines information about intersecting roads to infer traffic information outside the current path of travel, which is nevertheless of high relevance.

By providing for bandwidth-efficient delivery of highly relevant traffic information, the client 102 may implement periodic or time-and-distance-based algorithms for retrieving traffic information from the server 116. In one embodiment, the mobile device 102 polls the server 116 for traffic information from time to time in a manner based on the amount of time that has elapsed since the last time traffic information was received. In another embodiment, the server 116 pushes relevant traffic information periodically to the client 102. In one embodiment, high priority traffic information is requested or pushed with greater frequency than medium priority information, and in turn, medium priority information more frequently than low priority information.

The present invention also enables a client device 102 to provide spoken, personalized traffic reports on demand, similar in nature to typical radio traffic broadcasts but customized to current position, heading, and/or route of the driver. In some embodiments, user interface module 108 provides the ability to request a traffic report on demand. In some such embodiments, the request is made by pressing a button to request the traffic report; in some others, a voice recognition component is used to recognize a spoken request. On receipt of the request, mobile device 102 supplies information regarding the driver's current position to the server 116. In various embodiments, the information includes one or more of the driver's current position, heading, planned route, and/or typical driving behavior. The server then transmits a traffic report customized to the driver's position as sent, as described above. In various embodiments, one or more of real-time, historic, and predictive traffic information is used. The customized traffic report is then presented to the driver. In some embodiments, this presentation is spoken by using a text-to-speech component. In some embodiments, the routing engine 110 of the server re-computes a route to the driver's current destination in order to suggest alternative routes.

In some embodiments, this traffic report is combined with a speech recognition unit to allow drivers to speak instructions to change the current route. For example, in response to a traffic report, the driver can say "Use two eighty instead", which prompts the routing engine to recomputed a route with a preference for Highway 280. Similarly, when an alternative route is described, the driver can say something such as "Use that one" to select it.

In some embodiments, the server can also use historic or predictive traffic information to produce personalized traffic reports for future trips. For example, the driver can request a traffic report for a drive from home to San Francisco Airport next Friday at 5:00 p.m.

In one embodiment, drivers are billed for their use of system 100. A driver may be billed, for example, based on volume of information exchanged between mobile device 102 and server 116. Alternatively, a pricing model can be based on number of transactions, with one planned route constituting a single transaction. In one embodiment, usage data is tracked by server 116, and in an alternative embodiment usage data is tracked by mobile device 102, and forwarded as appropriate to server 116 for subsequent billing.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components. For example, the particular functions of the server 116 may be provided in many or one module.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A system for providing navigation guidance to a driver, comprising:
    a processor;
    a database including address and mapping information;
    a traffic module, executed by the processor and adapted to receive real-time traffic data and predict future traffic data based on forecast weather data; and
    a server routing engine, executed by the processor and coupled to the database and the traffic module, and adapted to:
        receive from a client navigation device a plotted route from an origin to a destination and alternate routing preferences;
        determine, using the real-time and predicted future traffic data received by the traffic module, an estimated time from the origin to the destination along the plotted route;
        identify according to the routing preferences at least one alternative route from the origin to the destination, the alternative route having an estimated driving time based on real-time and predicted future traffic data less than the determined estimated time along the plotted route; and
        transmit over a network to a mobile navigation device the estimated time along the plotted route, and the alternative route.

2. The system of claim 1 wherein the server routing engine is further adapted to prioritize predicted traffic information over real-time traffic information in identifying the alternative route.

3. The system of claim 1 wherein the server routing engine is further adapted to prioritize real-time traffic information over predicted traffic information in identifying the alternative route.

4. The system of claim 1 wherein the server routing engine is further adapted to use historic traffic information to identify the alternative route.

5. The system of claim 1 wherein the alternate routing preferences include a preference for a fastest alternate route.

6. The system of claim 1 wherein the alternate routing preferences include a preference for an easiest alternate route.

7. The system of claim 1 wherein the alternate routing preferences include a preference for an alternate route that avoids tolls.

8. A method for providing navigation guidance to a driver, the method comprising:
    receiving, on a client navigation device, a route destination;
    plotting, by the client navigation device, a first route from a starting position to the destination, the plotted route not determined using real-time traffic information;
    transmitting the first route from the client navigation device to a server;
    responsive to receiving from the server within a threshold time traffic information about the first route and a second route to the route destination:
        displaying the received traffic information about the first route and the second route on the client navigation device, the displayed traffic information including an estimated driving time for each route determined based on real-time traffic information;
        receiving at the client navigation device a selection of one of the routes; and
        providing by the client navigation device route guidance along the selected route to the route destination; and
    responsive to the threshold time elapsing without receiving traffic information from the server:
        providing by the client navigation device route guidance along the first route to the route destination.

9. The method of claim 8 further comprising adjusting the threshold time in response to input received from a user of the client navigation device.

10. The method of claim 8 wherein the navigation device includes a global positioning system radio, and the route is plotted using information from the radio.

11. The method of claim 8 wherein traffic information related to the plotted route is requested from the server responsive to user input for the traffic information.

12. A computer program product for providing navigation guidance to a driver, the computer program product stored on a non-transitory computer readable medium and including instructions configured to cause a processor to carry out the steps of:

receiving a route destination;

plotting first route from a starting position to the destination, the plotted route not determined using real-time traffic information;

transmitting the first route to a server;

responsive to receiving from the server within a threshold time traffic information about the first route and a second route to the route destination:

displaying the received traffic information about the first route and the second route on a client navigation device, the displayed traffic information including an estimated driving time for each route determined based on real-time traffic information;

receiving at the client navigation device a selection of one of the routes; and providing route guidance along the selected route to the route destination; and responsive to the threshold time elapsing without receiving traffic information from the server:

providing route guidance along the first route to the route destination.

13. The computer program product of claim 12 wherein traffic information related to the plotted route is requested from the server responsive to receiving user input requesting the traffic information.

14. The computer program product of claim 12 further comprising instructions configured to adjust the threshold time in response to input received from a user of the client navigation device.

\* \* \* \* \*